US010592023B2

United States Patent
Li

(10) Patent No.: US 10,592,023 B2
(45) Date of Patent: Mar. 17, 2020

(54) TOUCH DISPLAY ASSEMBLY, TOUCH INPUT UNIT AND TOUCH INPUT METHOD

(71) Applicants: BOE TECHNOLOGY GROUP CO., LTD., Beijing (CN); BEIJING BOE DISPLAY TECHNOLOGY CO., LTD., Beijing (CN)

(72) Inventor: Dongxi Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/326,025

(22) PCT Filed: Feb. 4, 2016

(86) PCT No.: PCT/CN2016/073518
§ 371 (c)(1),
(2) Date: Jan. 12, 2017

(87) PCT Pub. No.: WO2017/049839
PCT Pub. Date: Mar. 30, 2017

(65) Prior Publication Data
US 2017/0262105 A1 Sep. 14, 2017

(30) Foreign Application Priority Data
Sep. 25, 2015 (CN) .......................... 2015 1 0621749

(51) Int. Cl.
*G06F 3/041* (2006.01)
*G06F 3/045* (2006.01)
(Continued)

(52) U.S. Cl.
CPC ........ *G06F 3/0412* (2013.01); *G06F 3/03547* (2013.01); *G06F 3/044* (2013.01);
(Continued)

(58) Field of Classification Search
CPC ........ G06F 3/0412; G06F 3/044; G06F 3/045; G06F 3/0488; G06F 2203/04103; G06F 3/03547
See application file for complete search history.

(56) References Cited

U.S. PATENT DOCUMENTS

2009/0322700 A1* 12/2009 D'Souza ................. G06F 3/045
345/174
2012/0194475 A1* 8/2012 Liao ........................ G06F 3/044
345/174
(Continued)

FOREIGN PATENT DOCUMENTS

CN 102822779 A 12/2012
CN 104216590 A 12/2014
(Continued)

OTHER PUBLICATIONS

CN204360364_ENG.pdf, by Liu, Chao; Published May 27, 2015. a machine English translation version of Chinese Patent Application CN204360364U.*
(Continued)

*Primary Examiner* — Wing H Chow
(74) *Attorney, Agent, or Firm* — Kinney & Lange, P.A.

(57) ABSTRACT

Embodiments of the present invention provide a touch display assembly. The touch display assembly includes a frame and a detecting module. The frame includes a plurality of electrically conductive portions independent of electrically insulated from each other, and the detecting module electrically connects at least two electrically conductive portions of the plurality of electrically conductive portions, wherein the detecting module is configured to generate and transmit a touch signal when an electrical conduction is established between the at least two electrically conductive portions of the plurality of electrically conductive portions (Continued)

by an external action. The present invention also provides a touch input unit for a display device and a touch input method.

18 Claims, 2 Drawing Sheets

(51) Int. Cl.
*G06F 3/0354* (2013.01)
*G06F 3/044* (2006.01)
*G06F 3/0488* (2013.01)

(52) U.S. Cl.
CPC ............ *G06F 3/045* (2013.01); *G06F 3/0488* (2013.01); *G06F 2203/04103* (2013.01)

(56) References Cited

U.S. PATENT DOCUMENTS

| | | | |
|---|---|---|---|
| 2013/0021089 A1* | 1/2013 | Sakurai | G06F 3/044 327/517 |
| 2013/0076656 A1* | 3/2013 | Sirpal | G06F 3/1438 345/173 |
| 2013/0321337 A1* | 12/2013 | Graham | G06F 3/03547 345/174 |
| 2015/0153861 A1 | 6/2015 | Yamazaki et al. | |

FOREIGN PATENT DOCUMENTS

| | | |
|---|---|---|
| CN | 204360364 U | 5/2015 |
| CN | 105138182 A | 12/2015 |
| CN | 204945978 U | 1/2016 |
| EP | 2687972 A2 | 1/2014 |
| JP | 2014119984 A | 6/2014 |

OTHER PUBLICATIONS

International Search Report and Written Opinion (including English translation of Box V.) dated Jul. 1, 2016, for corresponding PCT Application No. PCT/CN2016/073518.
Second Chinese Office Action, for Chinese Patent Application No. 201510621749.2, dated Dec. 22, 2017, 31 pages.
First Chinese Office Action, for Chinese Patent Application No. 201510621749.2, dated Jul. 24, 2017, 26 pages.
Extended European Search Report, for European Patent Application No. 16822100.0, dated Mar. 5, 2018, 10 pages.

* cited by examiner

TOUCH DISPLAY ASSEMBLY, TOUCH INPUT UNIT AND TOUCH INPUT METHOD

CROSS-REFERENCE TO RELATED APPLICATION

This application claims the benefit of Chinese Patent Application No. CN201510621749.2 filed on Sep. 25, 2015 in the State Intellectual Property Office of China, the whole disclosure of which is incorporated herein by reference.

BACKGROUND OF THE INVENTION

Field of the Invention

Embodiments of the present invention relate to the field of communication technique, in particular to a touch display assembly, a touch input unit and a touch input method.

Description of the Related Art

Currently, communication devices such as smart phones are rapidly developed and become more and more intelligent. For example, in addition to a touch panel, a smart phone can be provided with an infrared sensor, a voice operated device, a gravity sensing device, a camera and the like to provide various human-computer interaction.

A part of existing smart phones can detect a touch signal when being gripped by a user by adding sensors for sensing touch, temperature, pressure and the like for example on a frame and realize a power-up operation, an unlock operation, an answering operation and the like based on the detected signal and predetermined functions.

In addition, the frame of an existing smart phone is generally integrated-type or split-type. In a case of the split-type frame, as shown in FIG. 1, for example, the frame of the smart phone is composed of a plurality of edge frames 1 independent from each other. These independent edge frames 1 and elements such as a circuit board, a battery, a camera, a sensor (not shown) of the smart phone are assembled together by a frame adhesive 2.

SUMMARY OF THE INVENTION

At least one object of the present invention is to provide a touch display assembly which can realize human-computer interaction touch input with a split-type frame without adding additional input components.

Another object of the present invention is to provide a touch input unit for a display device which can realize human-computer interaction touch input with a split-type frame without adding additional input components.

Yet another object of the present invention is to provide a touch input method of a display device which can realize human-computer interaction touch input with a split-type frame without adding additional input components.

According to one aspect of the present invention, there is provided a touch display assembly comprising: a frame comprising a plurality of electrically conductive portions independent from each other and electrically insulated from each other; and a detecting module electrically connecting at least two electrically conductive portions of the plurality of electrically conductive portions, wherein the detecting module is configured to generate and transmit a touch signal when an electrical conduction is established between the at least two electrically conductive portions of the plurality of electrically conductive portions by an external action.

In an exemplary embodiment of the present invention, the detecting module comprises at least one of a current detecting module for detecting a current change, a capacitance detecting module for detecting a capacitance change or a resistance detecting module for detecting a resistance change.

In an exemplary embodiment of the present invention, the touch display assembly further comprises a display main module configured to receive the touch signal from the detecting module and perform a predetermined operation based on the touch signal.

In an exemplary embodiment of the present invention, the touch display assembly further comprises a frequency converting module configured to record a single conduction duration, the number of times and/or a frequency of the electrical conduction established between the at least two electrically conductive portions and feed them back to the display main module to perform the predetermined operation.

In an exemplary embodiment of the present invention, the display main module may comprise a printed circuit board on which the detecting module and the frequency converting module are disposed.

In an exemplary embodiment of the present invention, the electrical conduction between the at least two electrically conductive portions may be established by receiving a touch from human body on the electrically conductive portions. The touch comprises: an effective long-press touch which is a long-time touch in which a single touch lasts at least a first predetermined period; an effective single touch which is a single touch in which the at least two electrically conductive portions are simultaneously touched for a period less than a second predetermined period; and an effective successive touch which is several successive effective single touches in a third predetermined period.

In an exemplary embodiment of the present invention, at least one of the effective long-press touch, the effective single touch and the effective successive touch is able to perform the following predetermined operations including but not limited to: an operation for switching the display main module from a standby state to a waking up state, an operation for switching the display main module from the standby state to a camera opening state, and an operation for switching the display main module from the waking up state to the standby state.

In an exemplary embodiment of the present invention, the display main module is a display assembly of a mobile phone; the frame is an edge frame of the mobile phone; and the electrically conductive portion is an edge frame body of the mobile phone which is electrically conductive as a whole or an electrically conductive portion of the edge frame body of the mobile phone.

According to another aspect of the present invention, there is provided a touch input unit for a display device comprising: a frame comprising a plurality of electrically conductive portions independent of electrically insulated from each other; and a detecting module electrically connecting at least two electrically conductive portions of the plurality of electrically conductive portions, wherein the detecting module is configured to generate a touch signal and transmit the touch signal to the display device to perform a predetermined operation when an electrical conduction is established between the at least two electrically conductive portions of the plurality of electrically conductive portions by an external action.

In an exemplary embodiment of the present invention, the detecting module comprises a current detecting module for detecting a current change, a capacitance detecting module for detecting a capacitance change or a resistance detecting module for detecting a resistance change.

In an exemplary embodiment of the present invention, the touch input unit further comprises a frequency converting module configured to record a single conduction duration, the number of times and/or a power-on frequency of the electrical conduction established between the at least two electrically conductive portions and feed them back to the display device to perform the predetermined operation.

In an exemplary embodiment of the present invention, the electrical conduction between the at least two electrically conductive portions is established by receiving a touch of human body on the electrically conductive portions, the touch comprises: an effective long-press touch which is a long-time touch in which the single touch lasts at least a first predetermined period; an effective single touch which is a single touch in which the at least two electrically conductive portions are simultaneously touched for a period less than a second predetermined period; and an effective successive touch which is several successive effective single touches in a third predetermined period.

In an exemplary embodiment of the present invention, at least one of the effective long-press touch, the effective single touch and the effective successive touch is able to perform the following predetermined operations including but not limited to: an operation for switching the display device from standby state to a waking up state, an operation for switching the display device from the standby state to a camera opening state, and an operation for switching the display device from the waking up state to the standby state.

In an exemplary embodiment of the present invention, the display device is a display of a mobile phone; the frame is an edge frame of a housing of the mobile phone; and each of the electrically conductive portions is an edge frame body of the housing of the mobile phone which is electrically conductive as a whole or an electrically conductive portion of the edge frame body of the housing of the mobile phone.

According to yet another aspect of the present invention, there is provided a touch input method comprising steps of: providing a frame comprising a plurality of electrically conductive portions independent of electrically insulated from each other and a detecting module electrically connecting at least two electrically conductive portions of the plurality of electrically conductive portions, wherein the detecting module generates and transmits a touch signal when an electrical conduction is established between the at least two electrically conductive portions of the plurality of electrically conductive portions by an external action.

In an exemplary embodiment of the present invention, the detecting module comprises a current detecting module for detecting a current change, a capacitance detecting module for detecting a capacitance change or a resistance detecting module for detecting a resistance change.

In an exemplary embodiment of the present invention, the touch input method further comprises providing a display main module configured to receive the touch signal from the detecting module and perform a predetermined operation based on the touch signal.

In an exemplary embodiment of the present invention, the touch input method further comprises providing a frequency converting module configured to record a single conduction duration, the number of times and/or a frequency of the electrical conduction established between the at least two electrically conductive portions and feed them back to the display device to perform the predetermined operation.

In an exemplary embodiment of the present invention, the electrical conduction between the at least two electrically conductive portions is established by receiving a touch of human body on the electrically conductive portions, the touch comprises: an effective long-press touch which is a long-time touch in which the single touch lasts at least a first predetermined period; an effective single touch which is a single touch in which the at least two electrically conductive portions are simultaneously touched for a period less than a second predetermined period; and an effective successive touch which is several successive effective single touches in a third predetermined period.

In an exemplary embodiment of the present invention, at least one of the effective long-press touch, the effective single touch and the effective successive touch is able to perform the following predetermined operations including but not limited to: an operation for switching a communication device from standby state to a waking up state, an operation for switching the communication device from the standby state to a camera opening state, and an operation for switching the communication device from the waking up state to the standby state.

With the embodiments of the present application, for the split-type touch display assembly characterized by electrically conductive potions electrically insulated from each other, such as a display portion of a smart phone, any two electrically conductive potions serve as input units, the current detecting module, the capacitance detecting module or the resistance detecting module is used as the touch signal detecting module to perform an internal connection. Under an external touch of the fingers of the user, the electrical connection between the electrically conductive portions is realized, so that a touch signal is generated and transmitted, and the desired functional operation will also be realized based on predetermined rules of the touch signal. Thus, it is possible to realize desired touch functions simply by the touch signal generated and transmitted upon electrical conduction between the electrically conductive portions of the frame without adding additional external input components such as additional sensors.

Other objects and advantages of the present invention will be set forth in the following embodiments with reference to description of the embodiments and illustration of the accompanying drawings.

BRIEF DESCRIPTION OF THE DRAWINGS

In order to make the above and other objects, features and advantages of the present invention more clear, the present invention will be described with reference to the embodiments and accompanying drawings in which.

DETAILED DESCRIPTION OF PREFERRED EMBODIMENTS OF THE INVENTION

Figure 1:
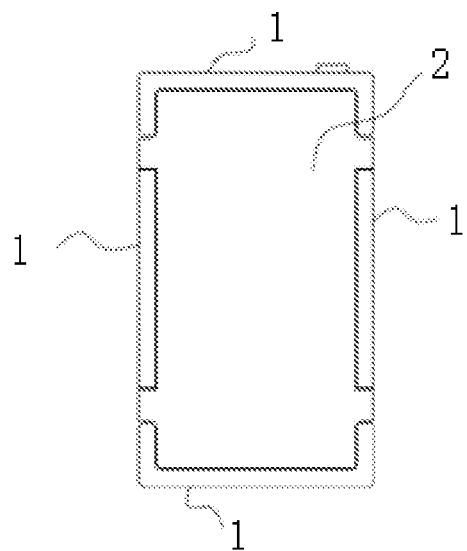
FIG. 1 is a schematic structural view of a split-type frame of an existing communication device in the prior art.

Embodiments of the present invention will be described in detail below. Examples of the specific embodiments are illustrated in accompanying drawings in which the same numerical references denote the same or similar elements throughout the drawings. The specific embodiments described below are illustrative and are intended to interpret the present invention, rather than limiting the present invention.

According to the inventive concept of the present invention, there is provided a touch display assembly, a touch input unit for a display device and a touch input method. According to an aspect of the present invention, there is provided a touch display assembly comprising a frame and a detecting module. The frame comprises a plurality of electrically conductive portions independent of electrically insulated from each other, and the detecting module electrically connects at least two electrically conductive portions of the plurality of electrically conductive portions, wherein the detecting module is configured to generate and transmit a touch signal when an electrical conduction is established between the at least two electrically conductive portions of the plurality of electrically conductive portions by an external action. According to another aspect of the present invention, there is provided a touch input unit for a display device comprising a frame and a detecting module. The frame comprises a plurality of electrically conductive portions independent of electrically insulated from each other, and the detecting module electrically connects at least two electrically conductive portions of the plurality of electrically conductive portions, wherein the detecting module is configured to generate a touch signal and transmit the touch signal to the display device to perform a predetermined operation when an electrical conduction is established between the at least two electrically conductive portions of the plurality of electrically conductive portions by an external action. According to yet another aspect of the present invention, there is provided a touch input method comprising providing a frame comprising a plurality of electrically conductive portions independent of electrically insulated from each other and a detecting module electrically connecting at least two electrically conductive portions of the plurality of electrically conductive portions, wherein the detecting module generates and transmits a touch signal when an electrical conduction is established between the at least two electrically conductive portions of the plurality of electrically conductive portions by an external action.

In the above touch display assembly, the touch input unit for the display device and the touch input method of the present invention, for the split-type touch display assembly characterized by electrically conductive potions electrically insulated from each other, such as a display portion of a smart phone, any two electrically conductive potions serve as input units, the current detecting module, the capacitance detecting module or the resistance detecting module is used as the touch signal detecting module to perform an internal connection. Under an external touch of the fingers of the user, the electrical connection between the electrically conductive portions is realized, so that a touch signal is generated and transmitted, and the desired functional operation will also be realized based on predetermined rules of the touch signal. Thus, it is possible to realize desired touch functions simply by the touch signal generated and transmitted upon electrical conduction between the electrically conductive portions of the frame without adding additional external input components such as additional sensors.

Figure 2:
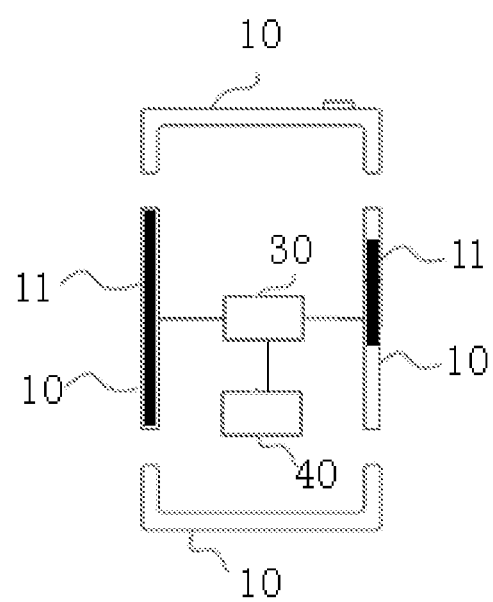
FIG. 2 is a schematic structural view of a touch display assembly according to an exemplary embodiment of the present invention.

Specifically, as shown in FIG. 2, a touch display assembly comprises a display main module (not shown), a frame consisting of a plurality of side frames 10 independent of electrically insulated from each other, a detecting module 30 electrically connecting at least two edge frames 10 and other components. According to an example embodiment of the present invention, each of the at least two edge frames of the plurality of edge frames 10 includes an electrically conductive portion 11. When the two electrically conductive portions 11 are electrically connected due to an external factor such as the two electrically conductive portions 11 being contacted by human body simultaneously, the detecting module 30 will generate and transmit a touch signal, and the display main module will receive the touch signal from the detecting module 30 and perform a predetermined operation based on the touch signal.

A split-type frame for a communication device for example is typically composed of two or more edge frames independent of electrically insulated from each other. In the embodiments of the present invention, it is only necessary for each of the at least two edge frames to be provided with the electrically conductive portion with conductive property. Once the human body, for example, fingers of a user simultaneously contact the electrically conductive portions of the two edge frames, the two edge frames will be electrically connected so as to cause the detecting module to generate and transmit the touch signal. For example, in the embodiment illustrated in FIG. 2, the edge frame 10 on the left side of the drawing is completely made of electrically conductive material such as metal, thereby being formed as the electrically conductive portion 11 as a whole, and the edge frame 10 on the right side of the drawing is partially made of electrically conductive metal, thus the metal portion thereof is formed as the electrically conductive portion 11. Of course, the present invention is not intended to limit the number and type of the electrically conductive portions and whether the electrically conductive portion is completely or partially formed from the edge frame. Meanwhile, besides the metal edge frame, the electrically conductive portion may be an edge frame having a touch screen. In a case where the electrically portion is the edge frame having the touch screen, the detecting module is electrically connected with the touch screen. According to embodiments of the present invention, the communication device as described above may be a mobile phone or a mobile phone housing. Of course, in a case where the communication device has a protection housing, the protection housing may be slotted at a predetermined position to expose the electrically conductive portions so as to assist in a contact operation performed by the user.

According to the embodiments of the present invention, the detecting module 30 includes, but not limited to, a current detecting module for detecting a current change, a capacitance detecting module for detecting a capacitance change, a resistance detecting module for detecting a resistance change and the like. The current detecting module may for example be a conventional current sensor in the relevant art, such as a resistance type current sensor, a magneto type current sensor, a transistor type current sensor, etc. The capacitance detecting module may for example be a conventional capacitive sensor in the relevant art, such as a capacitance meter, a multi-meter, etc. And the resistance detecting module may for example be a conventional resistance meter, such as a multi-meter, a bridge circuit, etc. In an exemplary embodiment in which the detecting module 30 is the current detecting module for detecting the current change, as shown in FIG. 2, when two different fingers of a user simultaneously contact the left and right electrically conductive portions 11, an electrical conduction state between the two electrically conductive portions 11 is changed from a power-off state to a power-on state, and the current detecting module 30 begins to detect the touch signal. When the two fingers of the user leave the two electrically conductive portions 11, the electrical conduction state between the two electrically conductive portions 11 is changed from the power-on state to the power-off state, and the current detecting module 30 stops detecting the touch signal. That is, a complete touch signal generating and detecting circuit is formed by touching the two electrically conductive portions 11 with the fingers of the user, and the current detecting module 30 captures a signal waveform of weak current in the above two procedures. In an exemplary embodiment in which the detecting module 30 is the capacitance detecting module for detecting the capacitance change, as shown in FIG. 2, when the two different fingers of the user simultaneously contact the left and right electrically conductive portions 11, a capacitance between the two electrically conductive portions 11 is changed from an initial capacitance C1 to a changed capacitance C2 which is different from the initial capacitance C1, the capacitance detecting module 30 beings to detect the touch signal. When the two fingers of the user leave the two electrically conductive portions 11, the capacitance between the two electrically conductive portions 11 is changed from the changed capacitance C2 to the initial capacitance C1, and the capacitance detecting module 30 stops detecting the touch signal. That is, a complete touch signal generating and detecting circuit is formed by touching the two electrically conductive portions 11 with the fingers of the user, and the capacitance detecting module 30 captures a signal waveform of the capacitance in the above two procedures, wherein a change of the capacitance C'=C2−C1. Similarly, in an exemplary embodiment in which the detecting module 30 is the resistance detecting module for detecting the resistance change, a resistance is changed by simultaneously contacting the left and right electrically conductive portions 11, and a signal waveform of the resistance is captured by the resistance detecting module.

According to embodiments of the present invention, as an example, as shown in FIG. 2, the touch display assembly further comprises a frequency converting module 40 for recording a single conduction duration, the number of times and/or a frequency of the electrical conduction established between the at least two electrically conductive portions 11 and feeding them back to the display main module to perform predetermined operations. In an embodiment of the disclosure, the frequency converting module may for example be a frequency converting circuit. For example, before the detecting module 30 transmits the corresponding touch signal to the display main module of the communication device, the frequency concerting module 40 records the power-on or power-off state, the single conduction duration, the number of times and/or the frequency of the electrical conduction in a predetermined period, performs a predetermined processing on the corresponding signal waveform, and feeds a corresponding logic value back to an operation system of the communication device. Then, the operation system outputs an instruction for performing a predetermined operation based on the logic value and a predetermined touch rule.

As an example, the display main module of the communication device comprises a printed circuit (not shown) on which the detecting module 30 and the frequency converting module 40 may be disposed.

As an example, it is possible to define an effective single touch, an effective long-press touch and an effective successive touch based on a duration of a touch action, the number (times) of touches and/or a frequency of touch in advance. For example, a long-time touch in which the single touch lasts at least a first predetermined period is defined as the effective long-press touch, a single touch in which the at least two electrically conductive portions are simultaneously touched for a period less than a second predetermined period is defined as the effective single touch, and several successive effective single touches in a third predetermined period are defined as the effective successive touch. As an example, the first predetermined period may be greater than the second predetermined period. It is possible to optionally select a single touch lasting for a period less than a certain single touch period as the effective single touch. For example, the first predetermined period for the effective long-press touch may be 3 seconds, the second predetermined period for the effective single touch may be 0.4 second, and the third predetermined period for the effective successive touch may be 1 second. In contrast, it is also possible to define an effective single touch for a period greater than a certain single touch period as an invalid touch. For example, a touch having a touch period greater than 5 second will be deemed as invalid touch by the system. Hereinafter, unless otherwise indicated, a single touch refers to the effective single touch. Further, several single touches in a continuous period, i.e., a certain numbers (times) of single touches in a predetermined period, refers to the several successive touch. For example, twice successive single touches in 1 second. According to embodiments of the present invention, a single touch in which the at least two electrically conductive portions are simultaneously touched for a period less than 0.4 second is defined as the effective single touch, and several successive effective single touches in a predetermined period such as 1 second is defined as the effective successive touch.

According to the present invention, in addition to the definitions to the effective long-press touch, the effective single touch and the effective successive touch, in the communication device according to embodiments of the present invention, it is also possible to define predetermined operations performed by the communication device based on the effective long-press touch, the effective single touch and the effective successive touch. As an example, at least one of the effective long-press touch, the effective single touch and the effective successive touch is able to perform the following predetermined operations including but not limited to: an operation for switching the communication device from standby state to a waking up state, an operation for switching the communication device from the standby state to a camera opening state, and an operation for switching the communication device from the waking up state to the standby state. For example, the single touch for once is defined as the operation for triggering a smart phone to be switched from the standby state to the waking up state, and successive touches for twice is defined as the operation for triggering the smart phone to be switched from the standby state to the camera opening state, successive touch for three times is defined as the operation for triggering the smart phone from a start-up state to the standby state, and the effective long-press touch is defined as for triggering a dialing operation of the smart phone, and the like.

Therefore, in the touch display assembly according to the embodiments of the present invention, any two electrically conductive potions of the frame serve as input units, the current detecting module, the capacitance detecting module or the resistance detecting module is used as the touch signal detecting module to perform an internal connection. Under an external touch of the fingers of the user, a touch signal is generated and detected, so that a desired functional operation will be realized based on a predetermined rule of touch signal. Thus, it is possible to realize the desired touch functions only by detecting the touch signal with the frame without adding additional external input components such as additional sensors.

In addition, an embodiment of the present invention also provides a touch input unit for a display device. As shown in FIG. 2, the touch input unit comprises a frame, a detecting module 30 and a frequency converting module 40. The frame includes a plurality of edge frames 10 independent of electrically insulated from each other. Each of at least two edge frames 10 of the plurality of edge frames 10 includes an electrically conductive portion 11. The detecting module 30 electrically connects the at least two electrically conductive portions 11 of the plurality of edge frames 10, and the frequency converting module 40 is used to record a single conduction duration, the number of times and/or a frequency of the electrical conduction established between the at least two electrically conductive portions 11 and feed them back to the display device to perform predetermined operations. When the two electrically conductive portions 11 are electrically conducted due to an external factor such as simultaneous contact of the at least two electrically conductive portions 11 by human body, the two electrically conductive portions 11 are electrically conducted so that the detecting module 30 generates a touch signal and transmits the touch signal to the communication device to perform a predetermined operation. The detecting module 30 comprises a current detecting module for detecting a current change, a capacitance detecting module for detecting a capacitance change or a resistance detecting module for detecting a resistance change.

A split-type frame for a display device for example is typically composed of two or more edge frames independent of electrically insulated from each other. In the embodiments of the present invention, it is only necessary for each of the at least two edge frames to have an electrically conductive portion with conductive property. Once a human body, for example, fingers of a user simultaneously contact the electrically conductive portions of the two edge frames, the two edge frames will be electrically conducted so as to cause the detecting module to generate and transmit the touch signal. For example, in the embodiment illustrated in FIG. 2, the edge frame 10 on the left side of the drawing is completely made of electrically conductive material such as metal, thereby being formed as the electrically conductive portion 11 as a whole, and the edge frame 10 on the right side of the drawing is partially made of electrically conductive metal, thus the metal portion thereof is formed as the electrically conductive portion 11. Of course, the present invention is not intended to limit the number and type of the electrically conductive portion and whether the electrically conductive portion is completely or partially formed from the edge frame. Meanwhile, besides the metal frame, the electrically conductive portion may be an edge frame having a touch screen. In a case where the electrically portion is the edge frame having the touch screen, the detecting module is electrically connected with the touch screen. According to the present invention, the display device as described above may be a mobile phone, and the touch input unit may be disposed at a housing of the mobile phone.

In the touch input unit as described above, an effective long-press touch, an effective single touch and several successive effective touch and predetermined operations performed by the effective single touch and/or the effective successive touch may be defined in a similar way to those in the touch display assembly as described above. For example, a single touch in which the at least two electrically conductive portions are simultaneously touched for a period less than 0.4 second is defined as the effective single touch, several successive effective single touch in the predetermined period is defined as the effective successive touch, and the like. At least one of the effective long-press touch, the effective single touch and the effective successive touch is able to perform the following predetermined operations including but not limited to: an operation for switching the communication device from standby state to a waking up state, an operation for switching the communication device from the standby state to a camera opening state, and an operation for switching the communication device from the waking up state to the standby state.

Therefore, in the touch input unit according to embodiments of the present invention, any two electrically conductive potions serve as input units, the current detecting module, the capacitance detecting module or the resistance detecting module is used as the touch signal detecting module to perform an internal connection. Under an external touch of the fingers of the user, a touch signal is generated and detected, and the desired functional operation will also be realized based on predetermined rules of touch signal. Thus, it is possible to realize the desired touch functions only by detecting the touch signal through the frame without adding additional external input components such as additional sensors.

In addition, embodiments of the present invention also provides a touch input method implemented by the touch display assembly or the touch input unit as described above. The method comprises steps of: providing a frame, a display main module, a detecting module and a frequency converting module, wherein the frame includes a plurality of edge frames independent of electrically insulated from each other. Each of at least two edge frames of the plurality of edge frames includes an electrically conductive portion. The detecting module is electrically connected with the two electrically conductive portions. The display main module receives a touch signal from the detecting module and performs a predetermined operation based on the touch signal. The frequency converting module is used to record a single conduction duration, the number of times and/or a frequency of the electrical conduction established between the at least two electrically conductive portions 11 and feeding them back to the display main module to perform predetermined operations. When the two electrically conductive portions are electrically conducted due to an external factor such as simultaneous contact of the at least two electrically conductive portions by a human body, the detecting module generates and transmits the touch signal.

In the touch input method as described above, an effective long-press touch, an effective single touch and several successive effective touch and predetermined operations performed by the effective single touch and/or the effective successive touch may be defined in a similar way to those in the touch display assembly or the touch input unit as described above. For example, a single touch in which the at least two electrically conductive portions are simultaneously touched for a period less than 0.4 second is defined as the effective single touch, several successive effective single touch in the predetermined period is defined as the effective successive touch, and the like. The effective long-press touch, the effective single touch and/or the effective successive touch can perform the following predetermined operations including but not limited to: an operation for switching the communication device from standby state to a waking up state, an operation for switching the communication device from the standby state to a camera opening state, and an operation for switching the communication device from the waking up state to the standby state.

Figure 3:
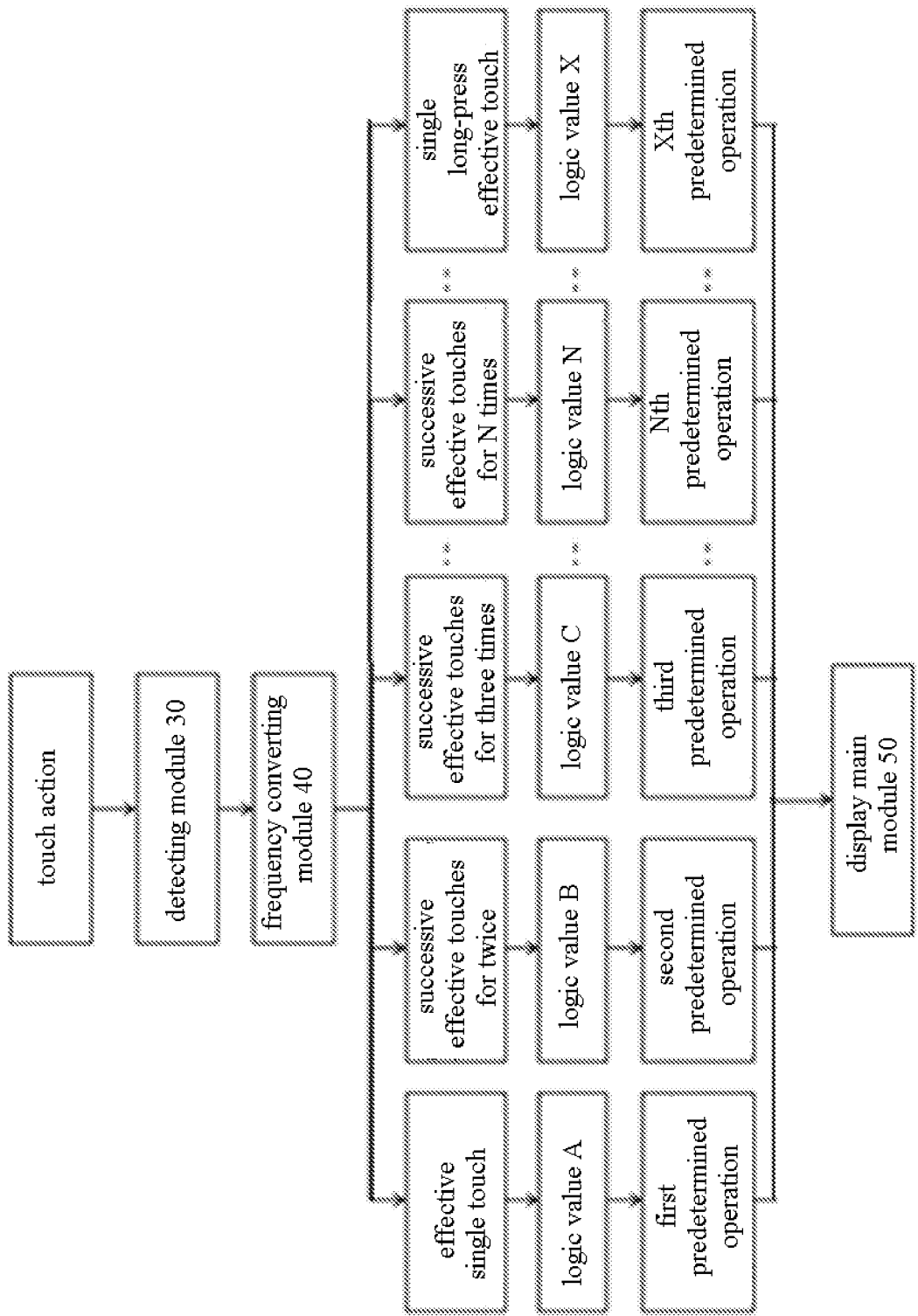
FIG. 3 is a schematic principle view of a touch input method according to an exemplary embodiment of the present invention.

FIG. 3 shows a schematic principle view of the touch input method according to a embodiment of the present invention. When different fingers of a user simultaneously touch the two electrically conductive portions, an electrical conduction is established between the two electrically conductive portions. At this time, the detecting module, such as a current detecting module, a capacitance module and a resistance module, connected between the two electrically conductive portions generates a signal waveform and transmits the touch signal. Then, the frequency converting module records the times and frequency of electrical conduction established between the two electrically conductive portions, performs processing on corresponding signal waveform and feeds back to the display main module. The display main module receives the touch signal and performs a predetermined operation based on the touch signal. Here, corresponding logic values are employed based on the predetermined definitions of the effective long-press touch, the effective single touch, and the effective several successive touch and definitions of predetermined operations performed by the effective single touch and/or the effective successive touch. Then, the logic values are feed back to an operation system of the communication device based on the detected touch action. The operation system will perform the predetermined operation based on the logic values. For example, as shown in FIG. 3, the effective single touch corresponds to the logic value A and performs a first predetermined operation, for example performs an operation for switching a smart phone from standby state to a waking up state, the continuous effective touch for twice corresponds to the logic value B and performs a second predetermined operation, for example performs an operation for switching the smart phone from standby state to a camera opening state, and the continuous effective touch for three times corresponds to the logic value C and performs a third predetermined operation, for example, performs an operation for switching the smart phone from a start-up state to the standby state which is defined by three successive touch, until continuous effective touch for N times corresponds to the logic value N and performs the corresponding $N^{th}$ predetermined operation, and the single long-press effective touch corresponds to the logic value X and performs a $X^{th}$ predetermined operation, for example, performs a dialing operation of the smart phone and the like.

Therefore, in the human-computer interaction touch input method according to embodiments of the present invention, any two electrically conductive potions serve as input units, the current detecting module, the capacitance detecting module or the resistance detecting module is used as the touch signal detecting module to perform an internal connection. Under an external touch of the fingers of the user, a touch signal is generated and detected, and the desired functional operation will also be realized based on predetermined rule of touch signal. Thus, it is possible to realize the desired touch functions only by detecting the touch signal through the frame without adding additional external input components such as additional sensors.

Note that, although in the above embodiments the touch signal is generated by establishing the electrically conduction between the electrical conductive portions with the finger touch, the present invention is not limited herein, and the electrical conduction between the electrical conductive portions may be established otherwise for example through a conductor such as a metal wire, a rod, a sheet or the like. Alternatively, it is also possible to trigger the above predetermined operations by a conductor hold by a user and electrically connecting different electrical conductive portions.

The above embodiments of the present invention merely illustratively describe the principle of the present invention and the advantages thereof, rather than limiting thereto. it should be appreciated by those skilled in the art various changes or modifications made without departing from the spirit and scope of the present invention should fall within the scope of the present invention. Therefore, the scope of the present invention is solely defined by the appended claims.

What is claimed is:

1. A touch display assembly comprising
   a frame comprising a plurality of edge frames independent of each other, the plurality of edge frames further comprising a plurality of electrically conductive portions electrically insulated from each other, wherein all or a portion of each of at least two edge frames of the plurality of edge frames function as a respective one of the plurality of electrically conductive portions; and
   a detecting module configured to electrically connect at least two electrically conductive portions of the plurality of electrically conductive portions, and comprising:
      a current detecting module configured to detect a current change;
   wherein the detecting module is configured to generate and transmit a touch signal when an electrical conduction is established between the at least two electrically conductive portions of the plurality of electrically conductive portions by an external action; and
   wherein the touch display assembly further comprises a display main module, the display main module being a display assembly of a mobile phone, and being configured to receive the touch signal from the detecting module and perform a predetermined operation based on the touch signal.

2. The touch display assembly according to claim 1, further comprising a frequency converting circuit configured to record a single conduction duration, a number of times and/or a frequency of the electrical conduction established between the at least two electrically conductive portions and feed them back to the display main module to perform the predetermined operation.

3. The touch display assembly according to claim 2, wherein the display main module comprises a printed circuit board on which the detecting module and the frequency converting circuit are disposed.

4. The touch display assembly according to claim 1, wherein the electrical conduction between the at least two electrically conductive portions is allowed to be established by receiving a touch of a human body on the two electrically conductive portions, the touch comprising at least one of:
   an effective long-press touch which is a long-time touch in which a single touch lasts at least a first predetermined period;
   an effective single touch which is a single touch in which the at least two electrically conductive portions are simultaneously touched for a period less than a second predetermined period; and
   an effective successive touch which includes several successive effective single touches within a third predetermined period.

5. The touch display assembly according to claim 4, wherein at least one of the effective long-press touch, the effective single touch and the effective successive touch is able to perform the following predetermined operations including but not limited to: an operation for switching the display main module from a standby state to a waking up state, an operation for switching the display main module from the standby state to a camera opening state, and an operation for switching the display main module from the waking up state to the standby state.

6. The touch display assembly according to claim 5, wherein
the frame is an edge frame of a housing of the mobile phone; and
each of the electrically conductive portions is an edge frame body of the housing of the mobile phone which is electrically conductive as a whole or an electrically conductive portion of the edge frame body of the housing of the mobile phone.

7. The touch display assembly according to claim 1, wherein the current detecting module is configured to capture a signal waveform of current in response to a complete circuit which is configured to generate and detect a touch signal being formed by touching two electrically conductive portions of the at least two electrically conductive portions with fingers of a user, wherein:
in response to two different fingers of the user simultaneously contacting two electrically conductive portions of the at least two electrically conductive portions, an electrical conduction state between the two electrically conductive portions is changed from a power-off state to a power-on state, and the current detecting module is configured to begin to detect the touch signal; and
in response to the two different fingers of the user leaving the two electrically conductive portions of the at least two electrically conductive portions, an electrical conduction state between the two electrically conductive portions is changed from the power-on state to the power-off state, and the current detecting module is configured to stop detecting the touch signal.

8. The touch display assembly according to claim 1, wherein the detecting module further comprises a capacitance detecting module, and the capacitance detecting module is configured to capture a signal waveform of the capacitance in response to a complete circuit which is configured to generate and detect a touch signal being formed by touching two electrically conductive portions of the at least two electrically conductive portions with fingers of a user, a change of the capacitance being a difference between a changed capacitance between the two electrically conductive portions upon touching and an initial capacitance therebetween without being touched, wherein:
in response to two different fingers of the user simultaneously contacting two electrically conductive portions of the at least two electrically conductive portions, the capacitance between the two electrically conductive portions is changed from the initial capacitance to the changed capacitance, and the capacitance detecting module is configured to begin to detect the touch signal; and
in response to the two different fingers of the user leaving the two electrically conductive portions of the at least two electrically conductive portions, the capacitance between the two electrically conductive portions is changed from the changed capacitance back to the initial capacitance, and the current detecting module is configured to stop detecting the touch signal.

9. The touch display assembly according to claim 1, wherein the detecting module further comprises a resistance detecting module that is configured to capture a signal waveform of the resistance in response to resistance being changed by simultaneously contacting two electrically conductive portions of the at least two electrically conductive portions with fingers of a user.

10. A touch input unit for a display device, comprising:
a frame comprising a plurality of edge frames independent of each other, the plurality of edge frames further comprising a plurality of electrically conductive portions electrically insulated from each other, wherein all or a portion of each of at least two edge frames of the plurality of edge frames function as a respective one of the plurality of electrically conductive portions; and
a detecting module configured to electrically connect at least two electrically conductive portions of the plurality of electrically conductive portions, and comprising:
a current detecting module configured to detect a current change;
wherein the detecting module is configured to generate a touch signal and transmit the touch signal to the display device to perform a predetermined operation when an electrical conduction is established between the at least two electrically conductive portions of the plurality of electrically conductive portions by an external action; and
wherein the touch input unit further comprises a display main module, the display main module being a display assembly of a mobile phone, and being configured to receive the touch signal from the detecting module and perform a predetermined operation based on the touch signal.

11. The touch input unit according to claim 10, further comprising a frequency converting circuit configured to record a single conduction duration and/or a number of times and/or a frequency of the electrical conduction established between the at least two electrically conductive portions and feed them back to the display device to perform the predetermined operation.

12. The touch input unit according to claim 10, wherein the electrical conduction between the at least two electrically conductive portions is allowed to be established by receiving a touch of a human body on the two electrically conductive portions, the touch comprising at least one of:
an effective long-press touch which is a long-time touch in which a single touch lasts at least a first predetermined period;
an effective single touch which is a single touch in which the at least two electrically conductive portions are simultaneously touched for a period less than a second predetermined period; and
an effective successive touch which includes several successive effective single touches within a third predetermined period.

13. The touch input unit according to claim 12, wherein at least one of the effective long-press touch, the effective single touch and the effective successive touch is able to perform the following predetermined operations including but not limited to: an operation for switching the display device from standby state to a waking up state, an operation for switching the display device from the standby state to a camera opening state, and an operation for switching the display device from the waking up state to the standby state.

14. The touch input unit according to claim 12, wherein
the display device is a display of the mobile phone;
the frame is an edge frame of a housing of the mobile phone; and
each of the electrically conductive portions is an edge frame body of the housing of the mobile phone which is electrically conductive as a whole or an electrically conductive portion of the edge frame body of the housing of the mobile phone.

15. A touch input method, comprising steps of:
providing a frame comprising a plurality of edge frames independent of each other, the plurality of edge frames further comprising a plurality of electrically conductive portions electrically insulated from each other, wherein all or a portion of each of at least two edge frames of the plurality of edge frames function as a respective one of the plurality of electrically conductive portions, and providing a detecting module configured to electrically connect at least two electrically conductive portions of the plurality of electrically conductive portions, the detecting module comprising: a current detecting module configured to detect a current change;
wherein the detecting module generates and transmits a touch signal when an electrical conduction is established between the at least two electrically conductive portions of the plurality of electrically conductive portions by an external action; and
wherein the touch input method further comprises: providing a display main module, the display main module being a display assembly of a mobile phone, and being configured to receive the touch signal from the detecting module and perform a predetermined operation based on the touch signal.

16. The touch input method according to claim 15, further comprising:
providing a frequency converting circuit configured to record a single conduction duration and/or a number of times and/or a frequency of the electrical conduction established between the at least two electrically conductive portions and feed them back to the display device to perform the predetermined operation.

17. The touch input method according to claim 15, wherein the electrical conduction between the at least two electrically conductive portions is allowed to be established by receiving a touch of a human body on the two electrically conductive portions, the touch comprising at least one of:
an effective long-press touch which is a long-time touch in which a single touch lasts at least a first predetermined period;
an effective single touch which is a single touch in which the at least two electrically conductive portions are simultaneously touched for a period less than a second predetermined period; and
an effective successive touch which includes several successive effective single touches within a third predetermined period.

18. The touch input method according to claim 17, wherein at least one of the effective long-press touch, the effective single touch and the effective successive touch is able to perform the following predetermined operations including but not limited to: an operation for switching a communication device from standby state to a waking up state, an operation for switching the communication device from the standby state to a camera opening state, and an operation for switching the communication device from the waking up state to the standby state.

* * * * *